(12) United States Patent
Sarlak et al.

(10) Patent No.: US 8,383,362 B2
(45) Date of Patent: Feb. 26, 2013

(54) FIXATIVE OF POLYMERIZED CARBON NANOTUBES ENCAPSULATING OSMIUM NANOPARTICLES FOR BIOLOGICAL TISSUE

(76) Inventors: Nahid Sarlak, Tehran (IR); Mostafa Karimi, Varamin (IR)

( * ) Notice: Subject to any disclaimer, the term of this patent is extended or adjusted under 35 U.S.C. 154(b) by 69 days.

(21) Appl. No.: 13/017,291

(22) Filed: Jan. 31, 2011

(65) Prior Publication Data
US 2011/0124040 A1    May 26, 2011

(51) Int. Cl.
*G01N 1/30* (2006.01)
*G01N 33/20* (2006.01)
(52) U.S. Cl. ...... 435/40.5; 435/40.52; 436/84; 977/742; 977/752; 977/773
(58) Field of Classification Search ............... None
See application file for complete search history.

(56) References Cited

U.S. PATENT DOCUMENTS

2007/0218283 A1* 9/2007 Geng et al. .......... 428/403
2011/0236437 A1* 9/2011 Destache .......... 424/400

OTHER PUBLICATIONS

Adeli et al. Encapsulation of palladium nanoparticles by multiwall carbon nanotubes-graft-poly(citric acid) hybrid materials. Journal of Applied Polymer Science, 2010, vol. 116, pp. 2188-2196.*

* cited by examiner

*Primary Examiner* — Shafiqul Haq (57) ABSTRACT

A fixative for biological tissue made up of polymerized carbon nanotubes encapsulating osmium nanoparticles and its method of synthesis are disclosed. Carbon nanotubes are first oxidized. Next, the oxidized carbon nanotubes and monohydrated citric acid are mixed to synthesize carbon nanotubes grafted with poly(citric acid). The carbon nanotubes grafted with poly(citric acid) are then mixed with an osmium source to synthesize carbon nanotubes grafted with poly(citric acid) encapsulating osmium nanoparticles. The nano-fixative of this application has been shown to improve fixation of biological tissue relative to well-known fixatives.

9 Claims, 14 Drawing Sheets

FIXATIVE OF POLYMERIZED CARBON NANOTUBES ENCAPSULATING OSMIUM NANOPARTICLES FOR BIOLOGICAL TISSUE

SPONSORSHIP STATEMENT

This application has been sponsored by the Iranian Nanotechnology Initiative Council, the University of Lorestan, and the Engineering Research Institute, which do not have any rights in this application.

TECHNICAL FIELD

This application generally relates to fixatives, and more particularly relates to a fixative of polymerized carbon nanotubes encapsulating osmium nanoparticles for biological tissue.

BACKGROUND

Carbon nanotubes (hereinafter "CNTs") have highly accessible surfaces, low resistivity, and are highly stable. Due to their special geometry and unique electronic, mechanical, chemical and thermal properties, CNTs have been used in various applications. For example, CNTs can be combined with polymers to produce different nanocomposites. In the past decade, various polymers, such as hyperbranched polymers, polycaprolactone ($C_6H_{10}O_2$), polystyrene (($C_8H_8)_n$), polyacrylates, and polyurea, have been combined with CNTs to produce nanocomposites.

Fixation is a process for stabilization of biological tissues. To stabilize biological tissue, decomposition caused by tissue enzymes and decay must be prevented and the tissue should be hardened for convenient handling. Generally, two approaches have been used to fixate biological tissue. The first approach is physical and involves the rapid heating or freezing of tissue. The second approach is chemical and involves applying organic fixatives, such as tannic acid ($C_{76}H_{52}O_{46}$), picric acid ($C_6H_3N_3O_7$), and absolute alcohol, or inorganic fixatives, such as potassium dichromate ($K_2Cr_2O_7$), mercuric chloride ($HgCl_2$), and osmium tetroxide ($OsO_4$), to biological tissue.

One common fixative, osmium tetroxide, stabilizes many proteins by transforming them into gels without destroying their structural features. In addition, tissue proteins that are stabilized by osmium tetroxide are not coagulated by alcohols during dehydration. Osmium tetroxide can also be used as a lipid staining agent in scanning electron microscopy, transmission electron microscopy, and optical microscopy.

SUMMARY

A method for synthesizing a fixative for biological tissue is disclosed. Carbon nanotubes are first oxidized. Next, the oxidized carbon nanotubes and monohydrated citric acid are mixed to synthesize carbon nanotubes grafted with poly(citric acid). The carbon nanotubes grafted with poly(citric acid) are then mixed with an osmium source to synthesize carbon nanotubes grafted with poly(citric acid) encapsulating osmium nanoparticles.

The carbon nanotubes can be oxidized by mixing the carbon nanotubes with nitric acid and sulfuric acid in a first mixture. In some embodiments, the ratio of the nitric acid to the sulfuric acid in the first mixture can be 1 to 3. The carbon nanotubes can be multi-walled carbon nanotubes. The oxidized carbon nanotubes can be extracted by drying the oxidized carbon nanotubes in a heated environment.

In some embodiments, the oxidized carbon nanotubes and the monohydrated citric acid can be dissolved in tetrahydrofouran to synthesize the carbon nanotubes grafted with poly(citric acid). The carbon nanotubes grafted with poly(citric acid) can be extracted by precipitating the mixture in cyclohexane.

In some embodiments, the osmium source can be osmium tetroxide and the osmium nanoparticles can be Os(VIII) ions. The carbon nanotubes grafted with poly(citric acid) encapsulating osmium nanoparticles can be extracted.

Another method for synthesizing a fixative for biological tissue is also disclosed. Carbon nanotubes, nitric acid, and sulfuric acid are mixed to oxidize the carbon nanotubes in a first mixture. Then, the oxidized carbon nanotubes are extracted from the first mixture. The oxidized carbon nanotubes and monohydrated citric acid are mixed to synthesize carbon nanotubes grafted with poly(citric acid) in a second mixture. Next, the carbon nanotubes grafted with poly(citric acid) are extracted from the second mixture. The carbon nanotubes grafted with poly(citric acid) are mixed with an osmium source to synthesize carbon nanotubes grafted with poly(citric acid) encapsulating osmium nanoparticles in a third mixture. Then, the carbon nanotubes grafted with poly(citric acid) encapsulating osmium nanoparticles are extracted from the third mixture.

A fixative for biological tissue can be synthesized by a process including oxidizing carbon nanotubes, mixing the oxidized carbon nanotubes and monohydrated citric acid to synthesize carbon nanotubes grafted with poly(citric acid), and mixing the carbon nanotubes grafted with poly(citric acid) with an osmium source to synthesize carbon nanotubes grafted with poly(citric acid) encapsulating osmium nanoparticles.

Details of one or more implementations and/or embodiments of the fixative of polymerized carbon nanotubes encapsulating osmium nanoparticles for biological tissue are set forth in the accompanying drawings and the description below. Other aspects that can be implemented will be apparent from the description and drawings, and from the claims.

BRIEF DESCRIPTION OF DRAWINGS

Like reference symbols indicate like elements throughout the specification and drawings.

DETAILED DESCRIPTION

Polymerized carbon nanotubes encapsulating osmium nanoparticles can be used as a fixative for biological tissue such as, for example, plant leaves and/or animal tissue. Following polymerization with poly(citric acid), CNTs can trap metal ions and also become soluble due to their citric acid branches. As such, polymerized CNTs can be synthesized that encapsulate osmium ions (Os(VIII)) on their surface for use in fixation of various biological tissues. Such a novel fixative enables higher resolution micrographs of biological tissue and longer fixation periods. Moreover, the fixative of polymerized CNTs encapsulating osmium nanoparticles can be recovered from biological tissue after use and reused.

Figure 1:
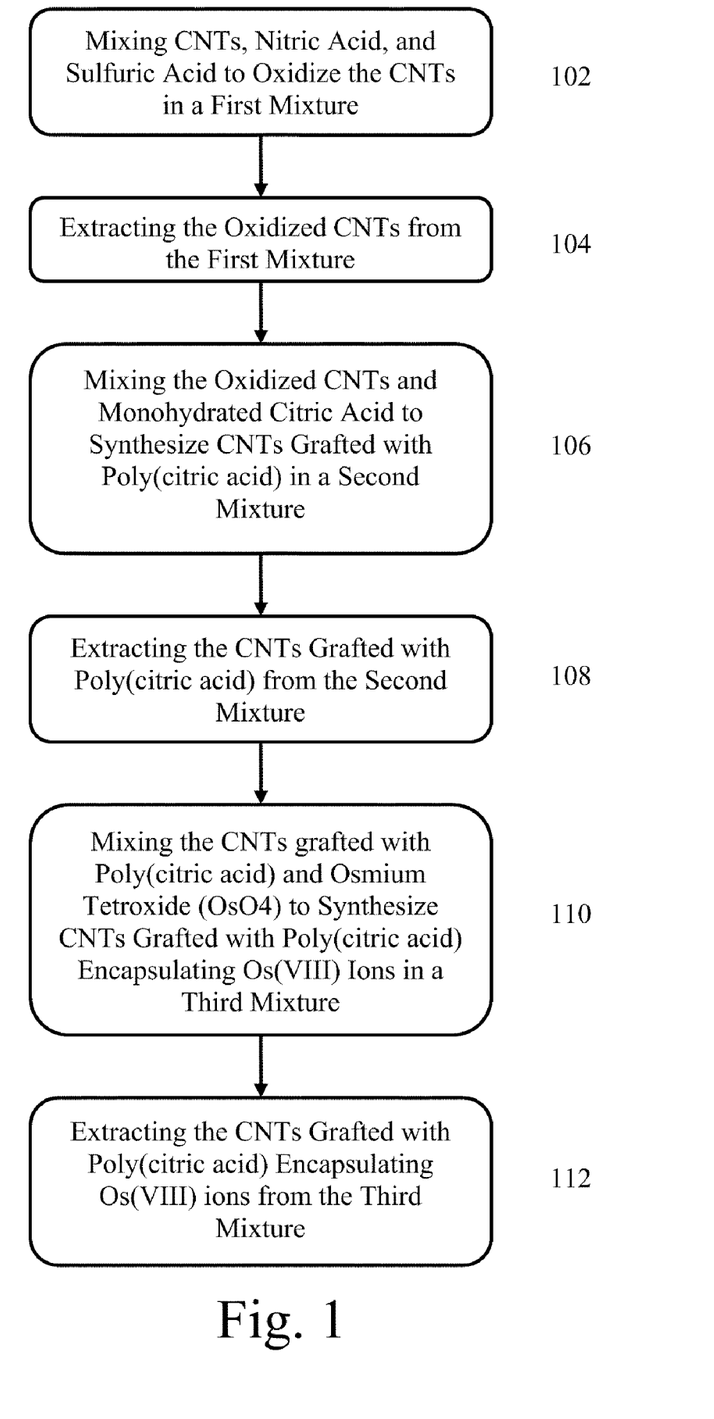
FIG. 1 illustrates an example of a method for synthesizing polymerized CNTs encapsulating osmium nanoparticles.

Referring to FIG. 1, a method for synthesizing polymerized carbon nanotubes encapsulating osmium nanoparticles is illustrated. Initially, CNTs, nitric acid ($HNO_3$), and sulfuric acid ($H_2SO_4$) are mixed to oxidize the CNTs in a first mixture (step 102). The CNTs can be, for example, single-walled CNTs (hereinafter "SWCNTs") and/or multi-walled CNTs (hereinafter "MWCNTs"). MWCNTs can have 3 to 15 walls, an outer diameter of 20 to 40 nm, and a length of 1 to 10 μm. In some embodiments, the MWCNTs can be synthesized over nanoporous Co—Mo/MgO by a chemical vapor deposition method at a temperature of about 900° C.

The nitric acid and the sulfuric acid can be mixed at, for example, a 1:3 ratio. For example, in some embodiments, 2 g of MWCNTs can be mixed with 40 mL of a nitric acid and sulfuric acid solution at a 1:3 ratio, i.e., about 10 mL of nitric acid and about 30 mL of sulfuric acid.

The mixture of CNTs, nitric acid, and sulfuric acid can be mixed in a reaction flask and refluxed for about 24 hours at 120° C. The resultant first mixture can then be cooled, diluted with distilled water, and filtered. The filtered product can then be washed with distilled water.

Next, the oxidized CNTs can be extracted from the first mixture (step 104). The filtrate resulting from step 102 can be dried in a vacuum oven for about 24 hours at 40° C. to extract the oxidized CNTs.

Figure 2:
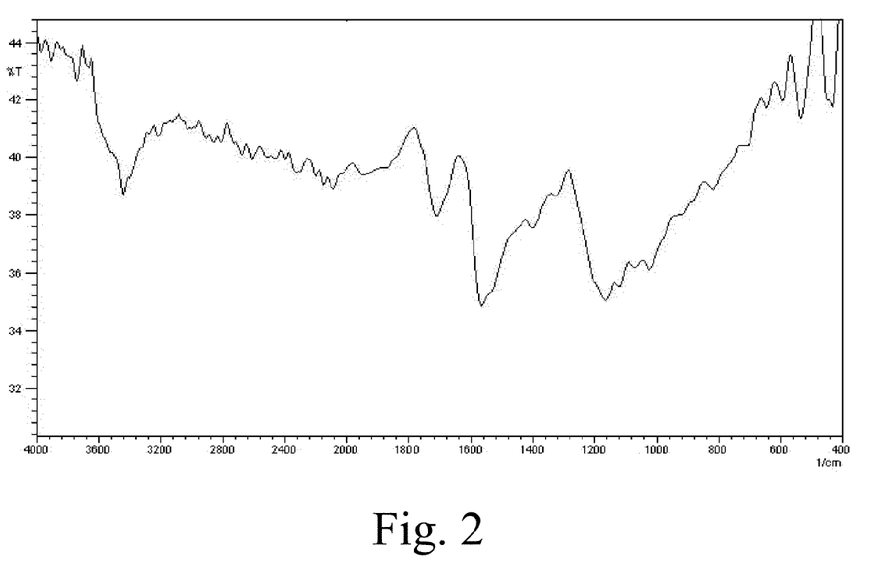
FIG. 2 illustrates a Fourier transform infrared spectrum of oxidized multi-walled CNTs.

The Fourier transform infrared (hereinafter "FTIR") spectrum of oxidized MWCNTs is illustrated in FIG. 2. The FTIR spectrum indicates that the treatment of nitric acid and sulfuric acid introduces functional groups onto the surface of the oxidized MWCNTs. The existence of hydroxyl groups, carbonyl groups, and carboxyl groups at 3444, 1700, and 1550 $cm^{-1}$, respectively, is shown in FIG. 2.

The oxidized CNTs and monohydrated citric acid are mixed to synthesize CNTs grafted with poly(citric acid) (hereinafter "CNTs-g-PCA") in a second mixture (step 106). Poly(citric acid) is a highly functional polymer with a large number of hydroxyl functional groups that confer a high loading capacity to the CNTs. In addition, the CNTs-g-PCA are soluble both in water and in organic solvents, such as, for example, methanol. Moreover, due to the relatively low cost of citric acid, polymerization of CNTs with poly(citric acid) is economically advantageous relative to other forms of polymerization.

In some embodiments, 0.05 g of oxidized CNTs and 2.5 g of monohydrated citric acid can be added to a polymerization ampoule equipped with a magnetic stirrer and a vacuum inlet. The second mixture can be heated to 120° C. and stirred for 30 minutes. Then, the temperature of the second mixture can be gradually increased to 140° C. over a time period of one hour while a dynamic vacuum is operated at proper intervals to remove the water from the second mixture. Following the removal of water by the dynamic vacuum, the reaction temperature can be raised to 160° C. and polymerization can continue at this temperature for one and a half hours. The resulting product can then be cooled and dissolved in tetrahydrofouran.

Next, the CNTs-g-PCA can be extracted from the second mixture (step 108). In some embodiments, the CNTs-g-PCA can be purified by precipitating the second mixture in cyclohexane to extract the free citric acid, leaving the purified CNTs-g-PCA in tetrahydrofouran.

Figure 3:
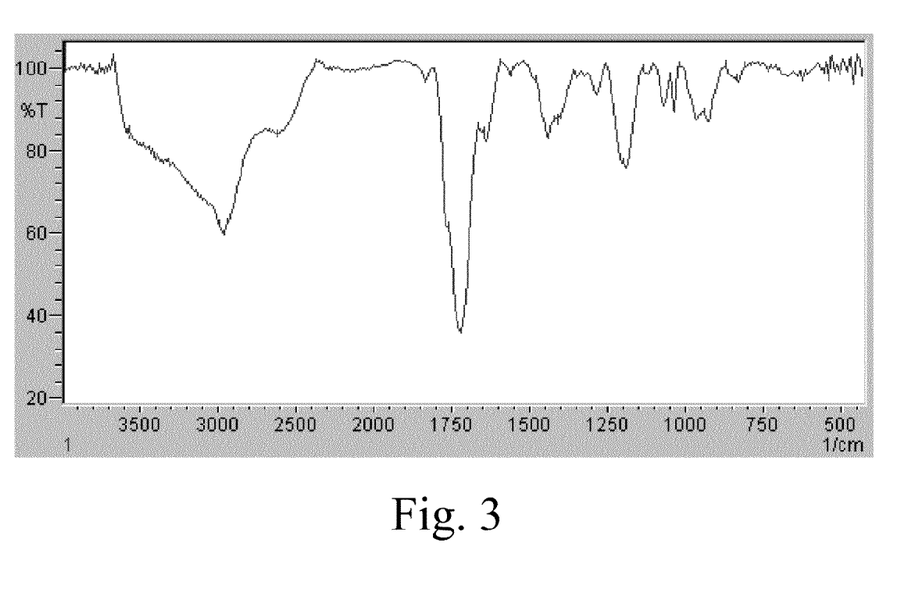
FIG. 3 illustrates a Fourier transform infrared spectrum of multi-walled CNTs grafted with poly(citric acid).

Referring to FIG. 3, the FTIR spectra of MWCNTs-g-PCA is illustrated. A broad absorbance band between 3600 $cm^{-1}$ and 2700 $cm^{-1}$ appears for the hydroxyl functional groups of the MWCNTs-g-PCA and the two absorbance bands of the carbonyl groups of citric acid appear at 1718 $cm^{-1}$ and 1637 $cm^{-1}$ in FIG. 3. The absorbance band of the carbon-to-carbon double bonds of the MWCNTs appears at 1500 $cm^{-1}$ in FIG. 3.

The CNTs-g-PCA and an osmium source, such as, for example, osmium tetroxide (OsO4) are mixed with water to synthesize CNTs-g-PCA encapsulating Os(VIII) ions (hereinafter "CNTs-g-PCA-Os") in a third mixture (step 110). For example, in some embodiments, $3 \times 10^{-3}$ moles of CNTs-g-PCA and $3.1379 \times 10^{-4}$ moles of osmium tetroxide can be mixed with water and sonicated at 30 kilohertz for 10 minutes to disperse the Os(VIII) ions in the polymeric shells of the CNTs-g-PCA. The third mixture can then be stirred at room temperature for four hours.

The CNTs-g-PCA-Os can then be extracted from the third mixture (step 112). In some embodiments, the water is first removed from the third mixture by a vacuum. The residue can then be dissolved in tetrahydrofouran and precipitated in cyclohexane, leaving the purified CNTs-g-PCA-Os.

Figure 4A:
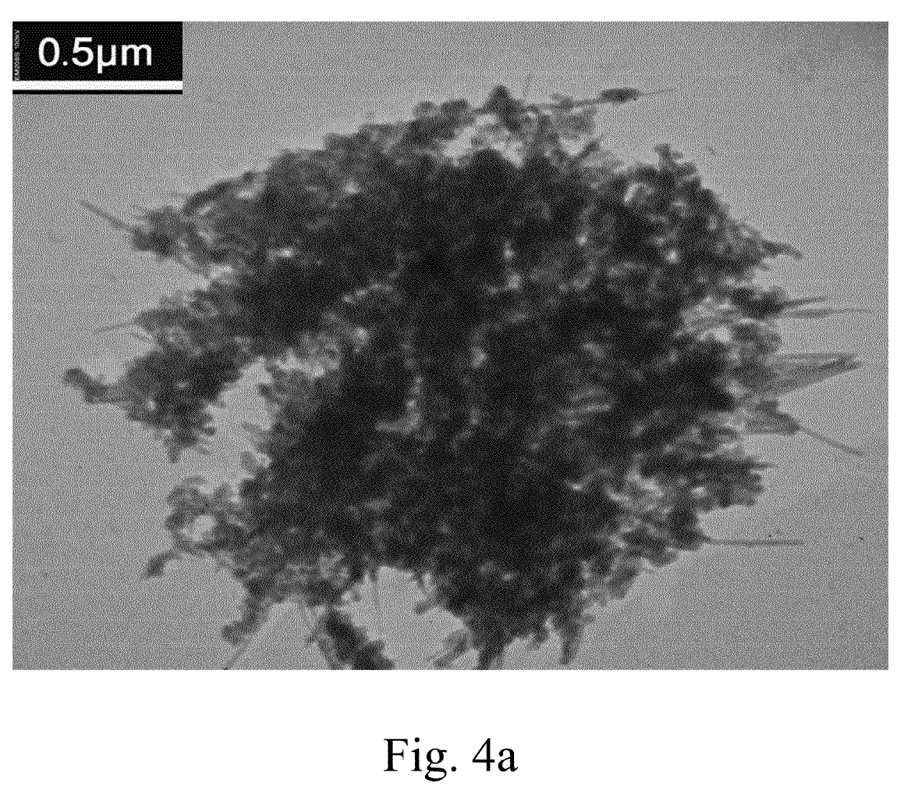
FIGS. 4a-c illustrate transmission electron micrographs of multi-walled CNTs grafted with poly(citric acid) encapsulating osmium nanoparticles
Figure 4B:
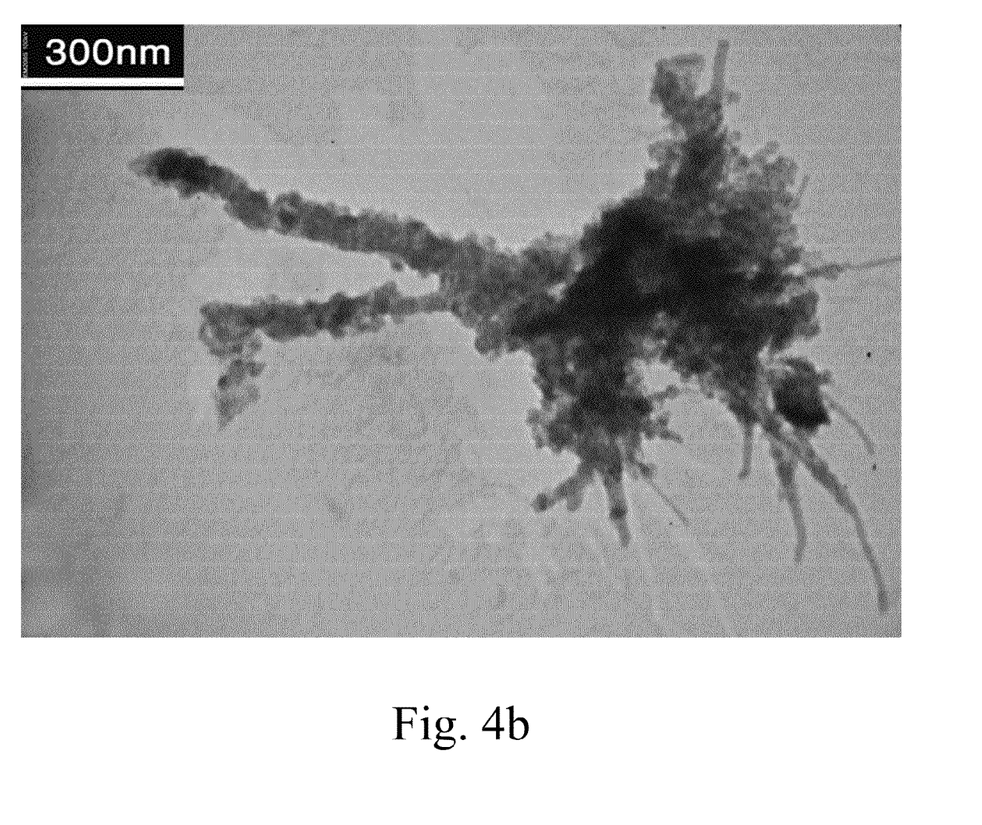
Figure 4C:
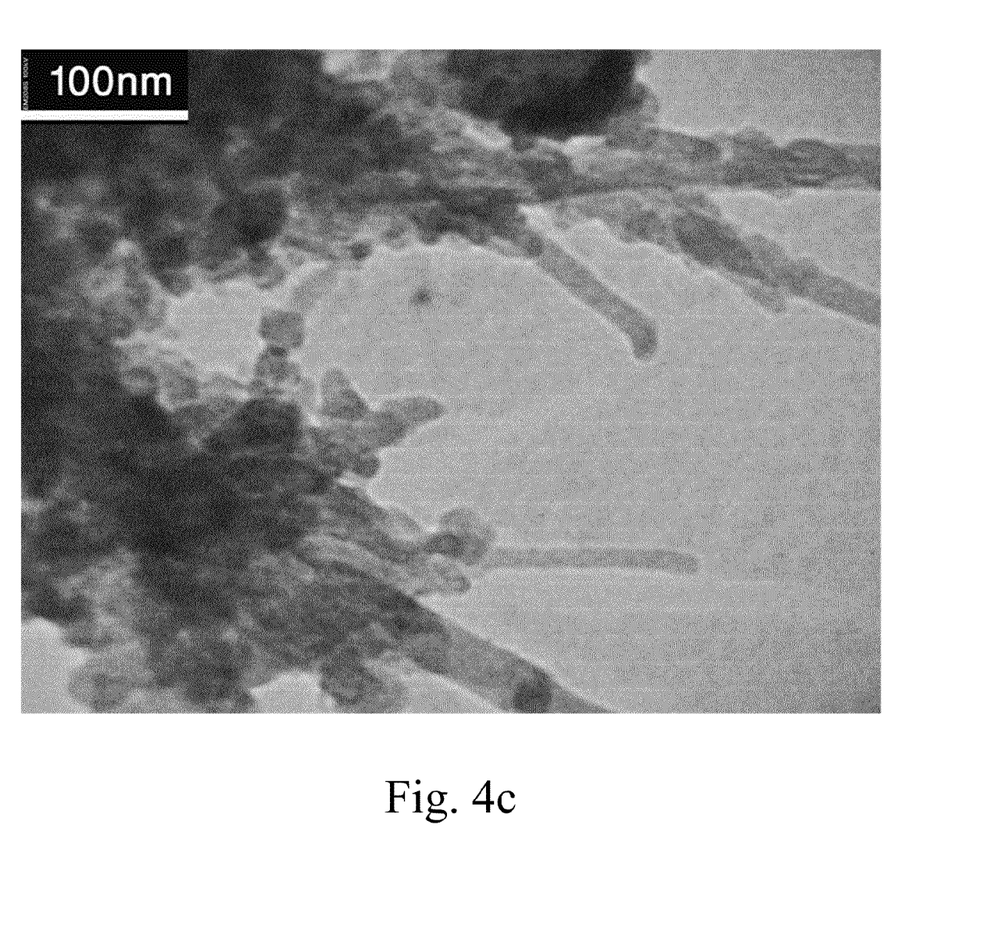

FIGS. 4a-c illustrate transmission electron microscopy (hereinafter "TEM") images of MWCNTs-g-PCA-Os synthesized according to the method of FIG. 1. The TEM images can be captured by, for example, a Philips transmission electron microscope operating at 100 kV. FIGS. 4a, 4b, and 4c clearly show the presence of Os(VIII) nanoparticles in the MWCNTs-g-PCA-Os at resolutions of 500 nanometers, 300 nanometers, and 100 nanometers, respectively.

In order to test the effectiveness of the CNTs-g-PCA-Os fixative, comparisons of plant tissues fixated with buffered CNTs-g-PCA-Os solution prepared according to the method of this application and traditional buffered osmium tetroxide were performed.

In one example, young leaves of tobacco were cut into small pieces having a thickness of about 1 mm. To fixate these tobacco pieces with osmium tetroxide, the pieces were placed in a buffered osmium tetroxide solution (1%), e.g., 1 gram of osmium tetroxide in 100 cc of a phosphate buffer solution, for 1 hour and agitated with a rotator. The pieces were then dehydrated by replacing the buffered osmium tetroxide solution with numerous alcohol solutions. Initially, a 50% alcohol solution was used to replace the buffered osmium tetroxide solution. The pieces were placed in the 50% alcohol solution for five minutes. Then the 50% alcohol solution was renewed and the pieces are placed in the solution for another five minute interval. Next, the 50% alcohol solution was replaced with a 70% alcohol solution and the pieces were placed in the solution for two consecutive five minute intervals. Then, the 70% alcohol solution was replaced with a 90% alcohol solution and the pieces were placed in the solution for two consecutive five minute intervals. Finally, the 90% alcohol solution was replaced with absolute alcohol and the pieces were placed in the solution for three consecutive 15 minute intervals. The pieces were then adequately fixated and ready for microscopy.

Using a similar procedure, to fixate tobacco pieces with CNTs-g-PCA-Os, the pieces were placed in a buffered CNTs-g-PCA-Os solution for 1 hour and agitated with a rotator. The pieces were then dehydrated according to the dehydration procedure explained above. The pieces were then adequately fixated and ready for microscopy.

Figure 5A:
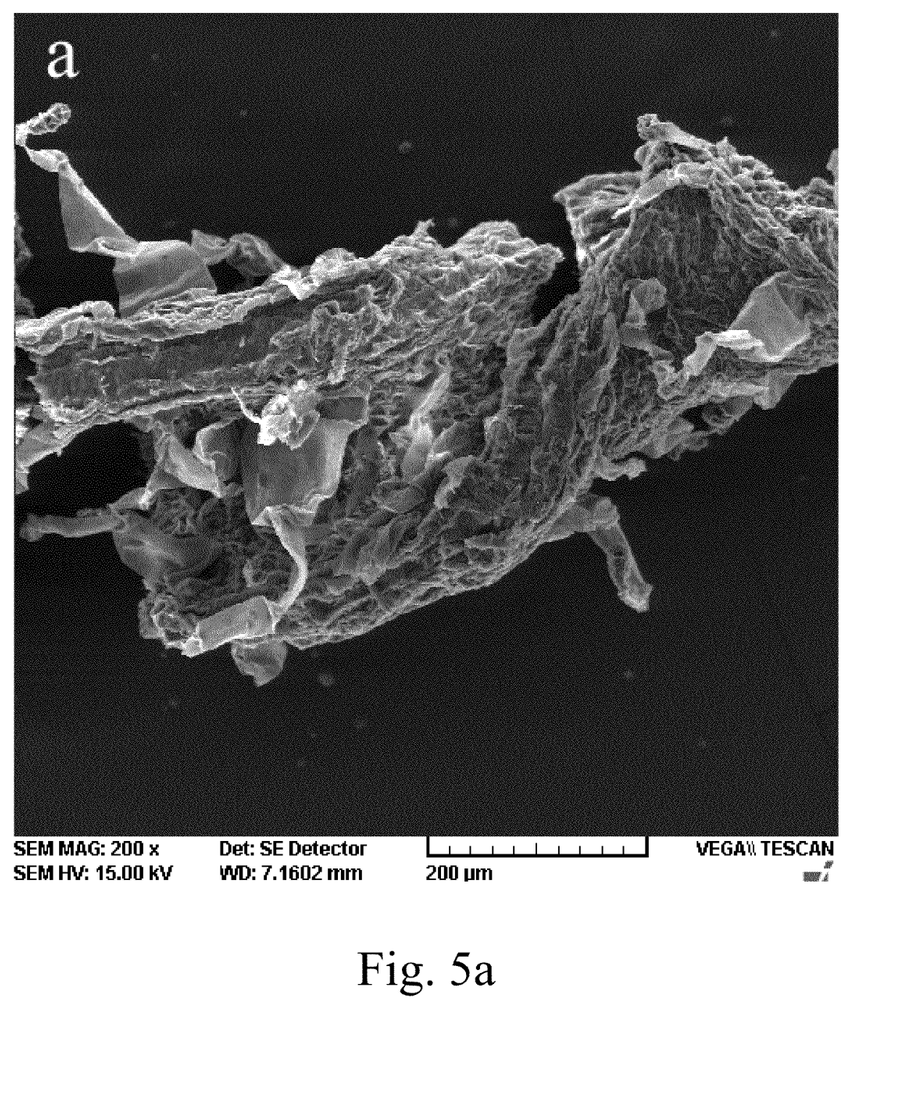
FIGS. 5a-d illustrate scanning electron micrographs of fixated tobacco leaves imaged three hours following fixation.
Figure 5B:
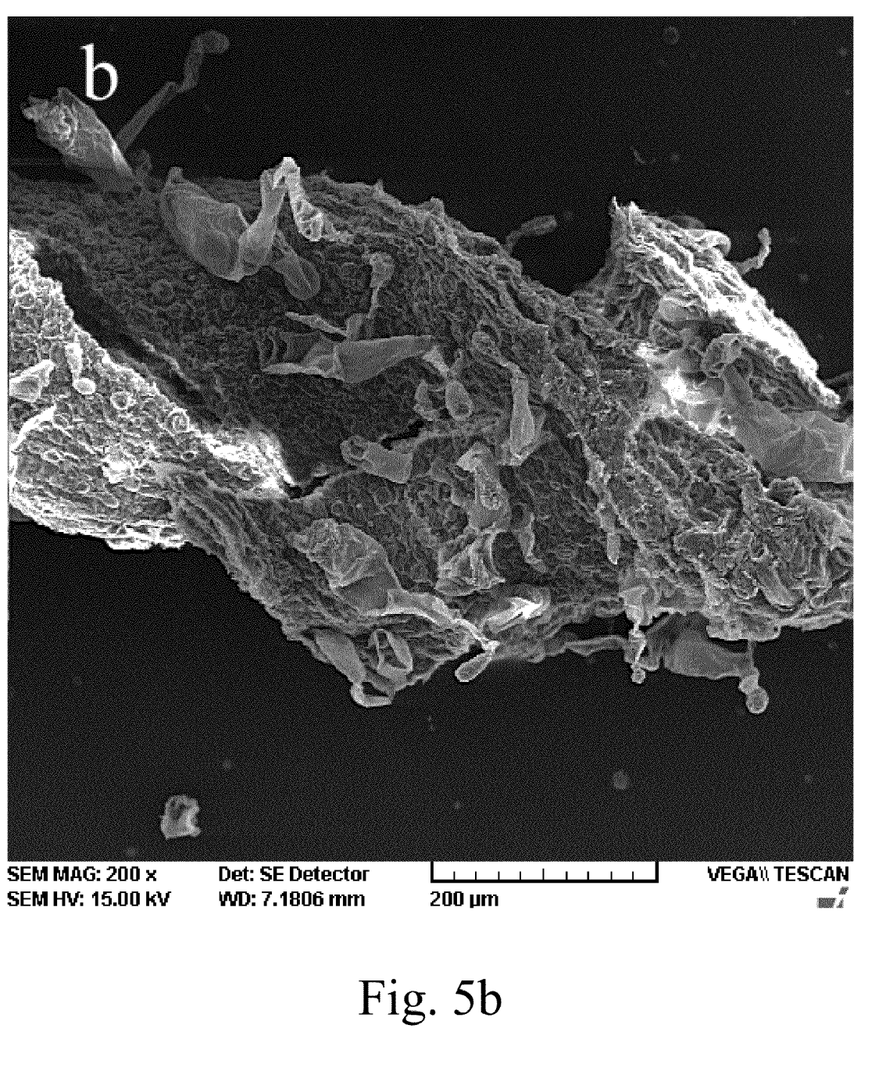
Figure 5C:
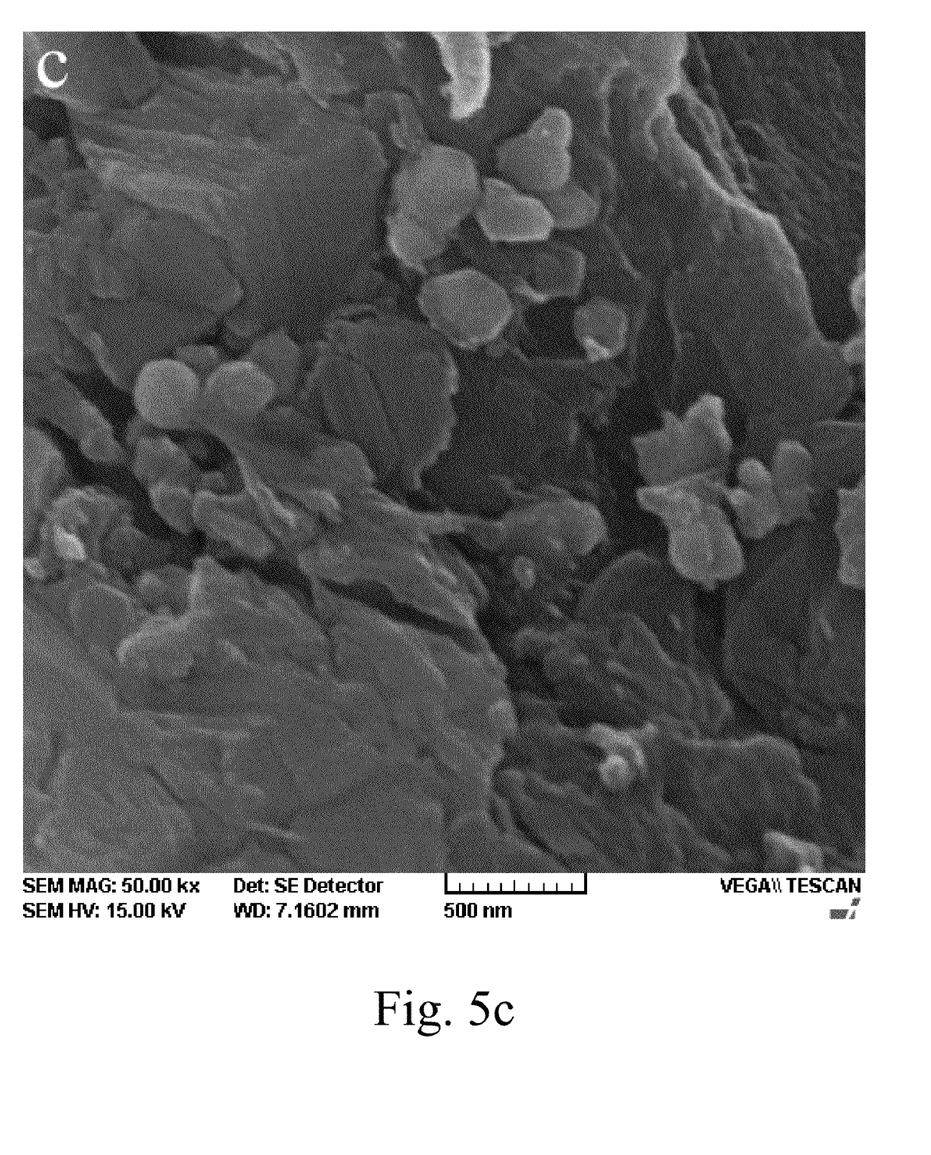
Figure 5D:
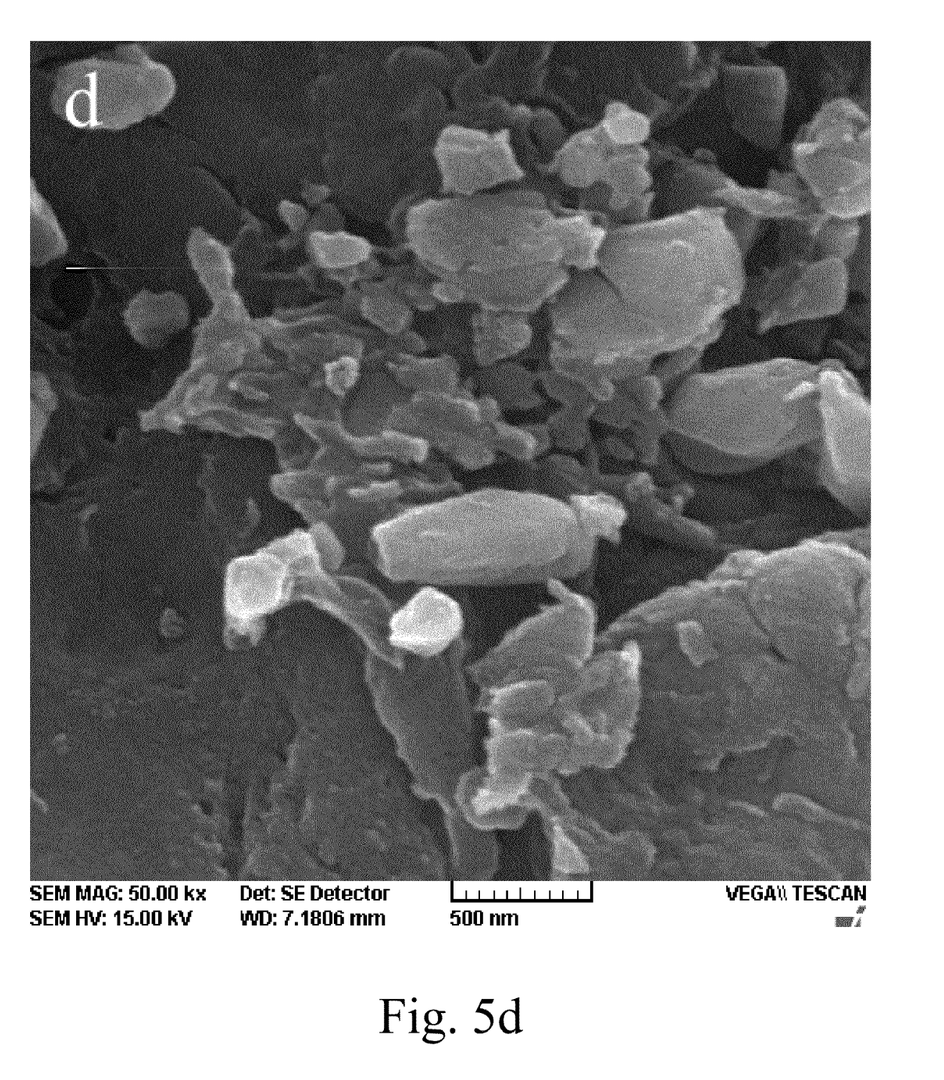

Scanning electron microscopy (hereinafter "SEM") images of the fixated tobacco pieces were captured using a scanning electron microscope operating at 15 kV. SEM images were captured for two sets of tobacco samples. Referring to FIGS. 5a-d, the first set of tobacco samples were tobacco leaves that were imaged three hours following fixation. FIGS. 5a and 5b show images of tobacco pieces fixated with buffered osmium tetroxide and buffered CNTs-g-PCA-Os, respectively, at a magnification of 200 times. FIGS. 5c and 5d show images of tobacco pieces fixated with buffered osmium tetroxide and buffered CNTs-g-PCA-Os, respectively, at a magnification of 50,000 times. As illustrated by FIGS. 5a-d, the resolution and contrast of the micrographs for the tobacco leaves fixated with buffered CNTs-g-PCA-Os are higher than those for tobacco leaves fixated with buffered osmium tetroxide.

Figure 6A:
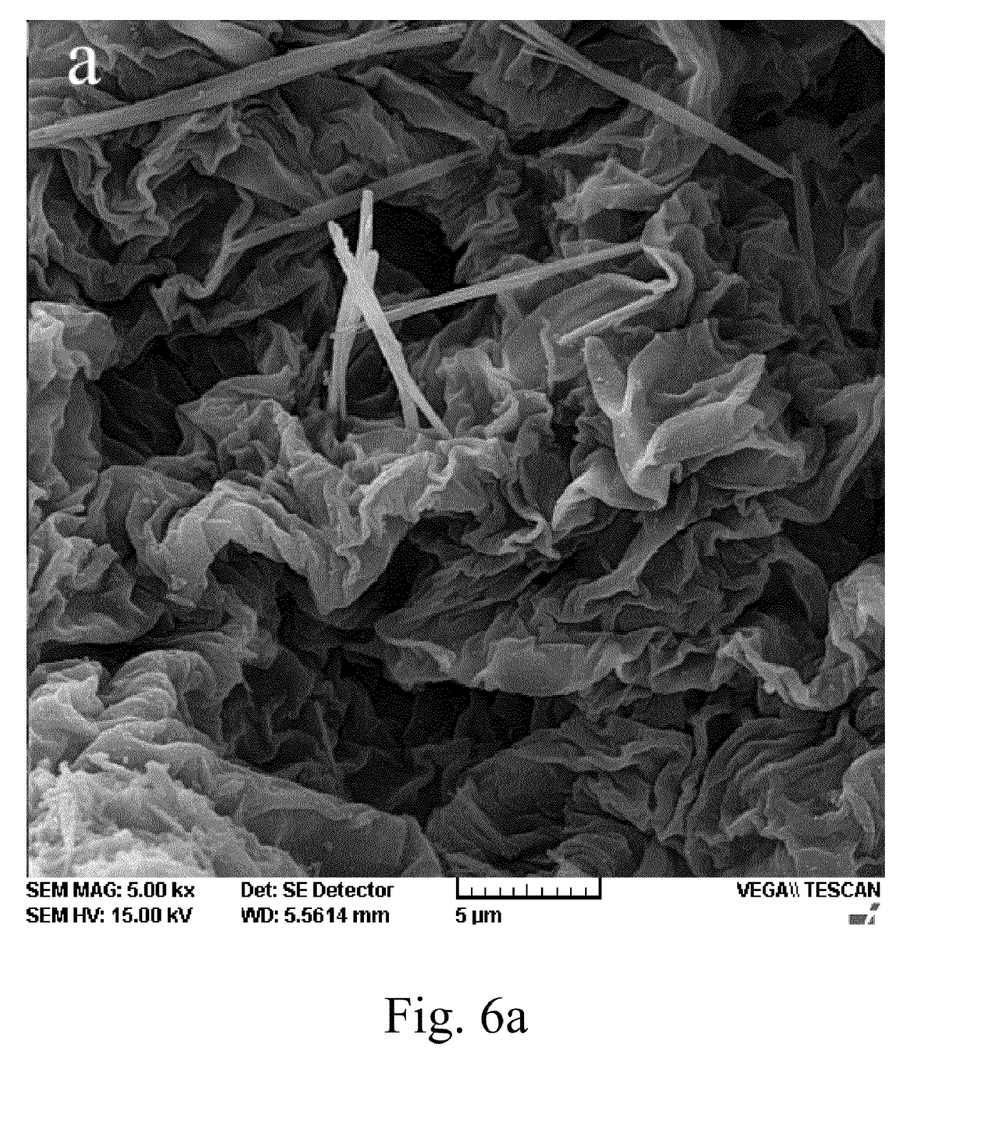
FIGS. 6a-e illustrate scanning electron micrographs of fixated tobacco leaves imaged one day following fixation.
Figure 6B:
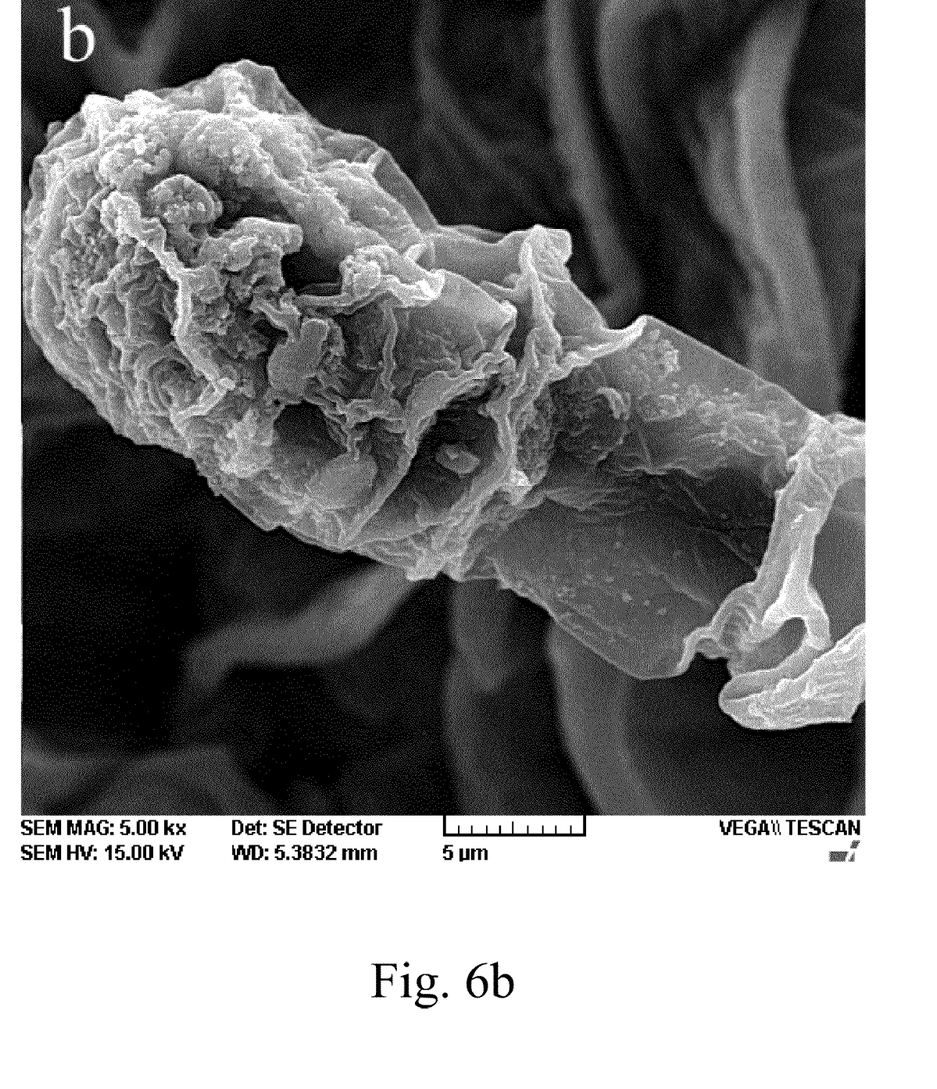
Figure 6C:
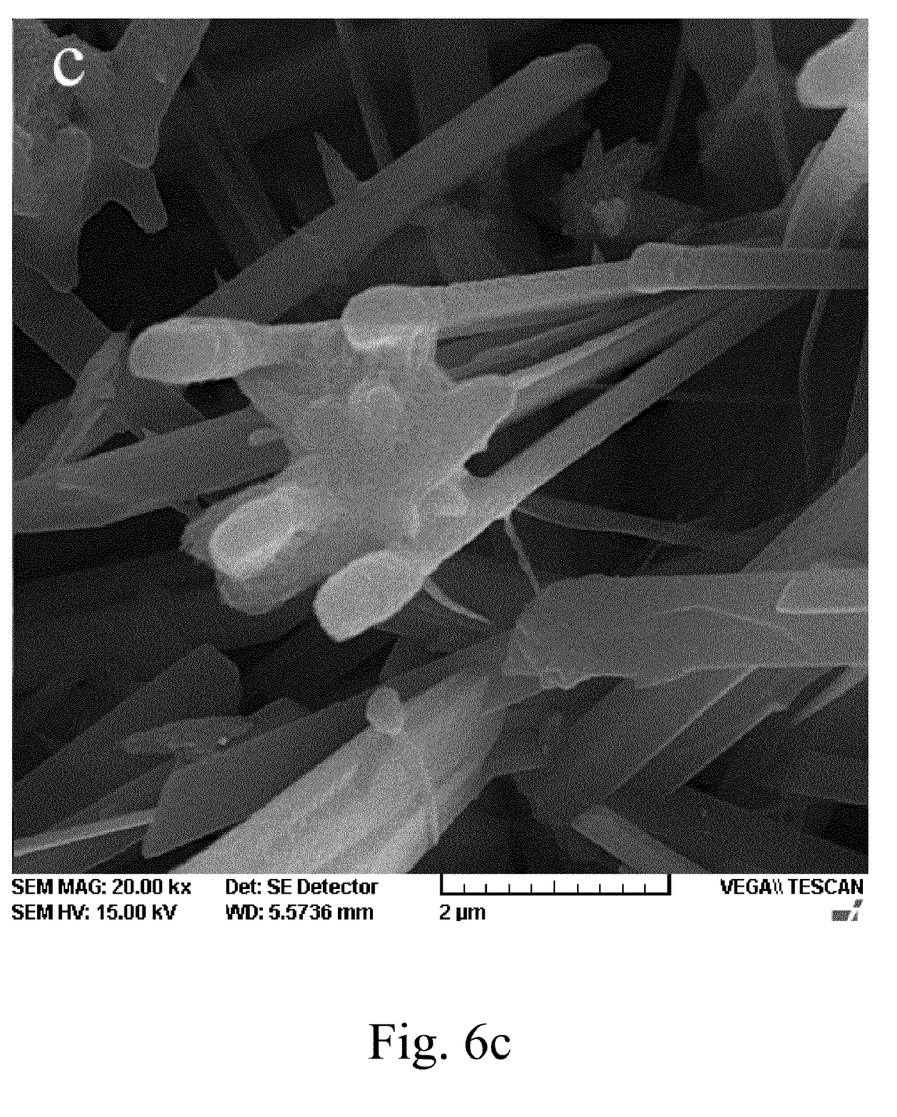
Figure 6D:
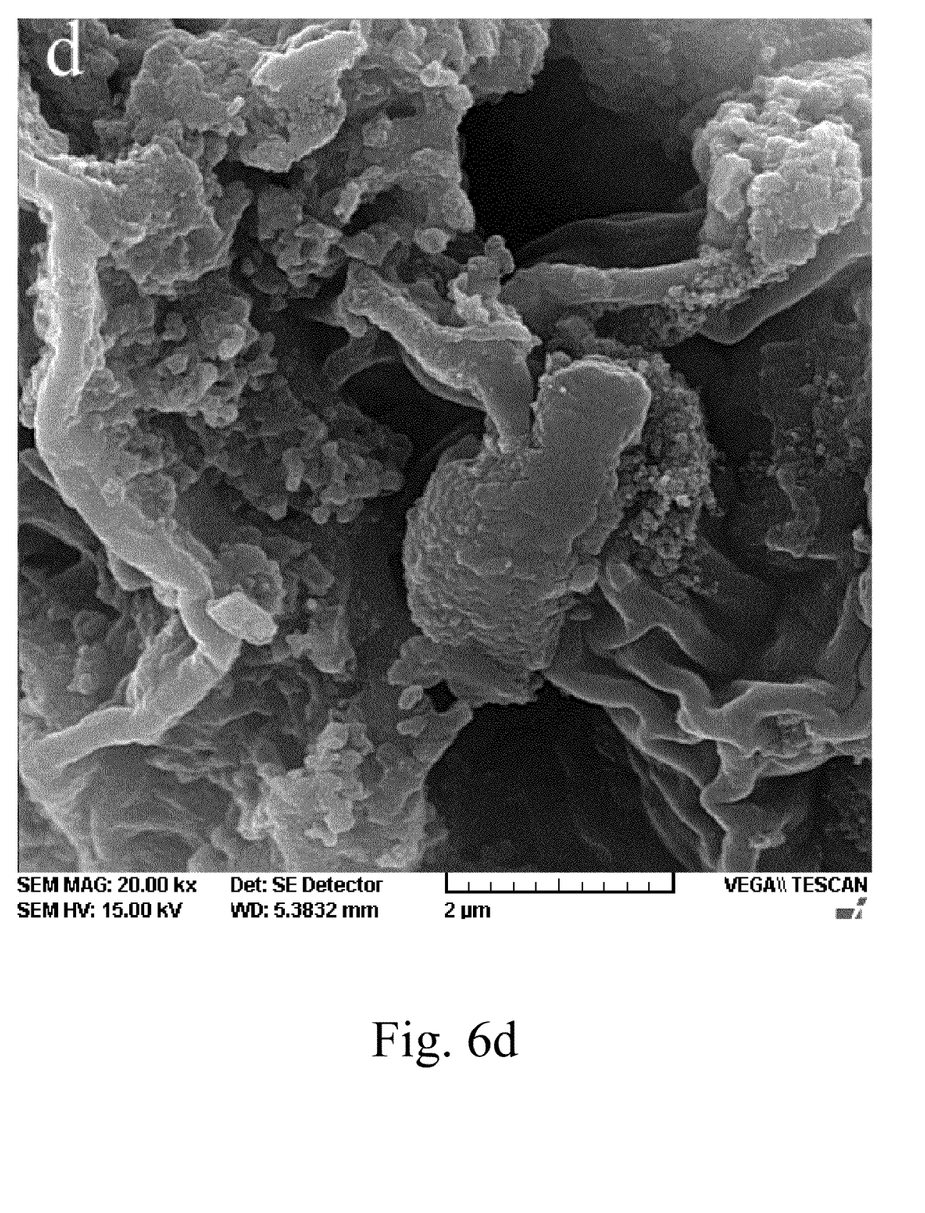
Figure 6E:
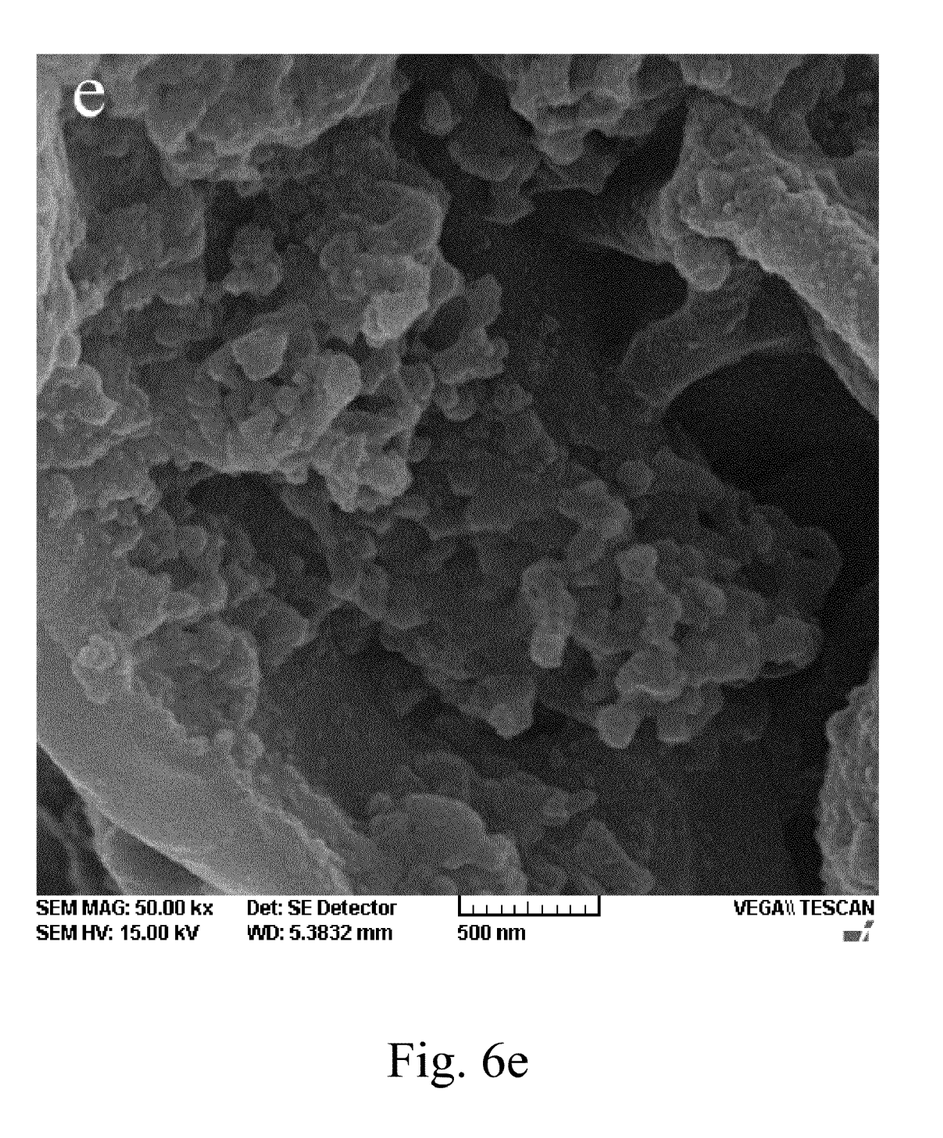

Referring to FIGS. 6a-e, the second set of tobacco samples were tobacco leaves that were imaged one day following fixation. FIGS. 6a and 6b show images of tobacco pieces fixated with buffered osmium tetroxide and buffered CNTs-g-PCA-Os, respectively, at a magnification of 5,000 times. FIGS. 6c and 6d show images of tobacco pieces fixated with buffered osmium tetroxide and buffered CNTs-g-PCA-Os, respectively, at a magnification of 20,000 times. FIG. 6e shows an image of a tobacco piece fixated with buffered CNTs-g-PCA-Os at a magnification of 50,000 times. As illustrated by FIGS. 6a-e, there is less damage done to the tobacco leaves for those samples fixated with buffered CNTs-g-PCA-Os after one day. Moreover, an SEM image at a magnification of 50,000 times was not possible for samples fixated with buffered osmium tetroxide after one day.

It is to be understood the implementations are not limited to the particular processes, devices, and/or apparatus described which may, of course, vary. It is also to be understood that the terminology used herein is for the purpose of describing particular embodiments only, and is not intended to be limiting. As used in this application, the singular forms "a", "an" and "the" include plural referents unless the content clearly indicates otherwise.

Reference in the specification to "one embodiment" or "an embodiment" means that a particular feature, structure, characteristic, or function described in connection with the embodiment is included in at least one embodiment herein. The appearances of the phrase "in some embodiments" in the specification do not necessarily all refer to the same embodiment.

Accordingly, other embodiments and/or implementations are within the scope of this application.

What is claimed is:

1. A method for fixing biological tissue, comprising:
   oxidizing carbon nanotubes;
   mixing the oxidized carbon nanotubes and monohydrated citric acid to synthesize carbon nanotubes grafted with poly(citric acid);
   mixing the carbon nanotubes grafted with poly(citric acid) with osmium tetroxide to synthesize carbon nanotubes grafted with poly(citric acid) encapsulating osmium nanoparticles; and
   applying the carbon nanotubes grafted with poly(citric acid) encapsulating osmium nanoparticles to biological tissue to fix the biological tissue.

2. The method of claim 1, wherein oxidizing the carbon nanotubes comprises mixing the carbon nanotubes, nitric acid, and sulfuric acid to oxidize the carbon nanotubes in a first mixture.

3. The method of claim 2, wherein, wherein the ratio of the nitric acid to the sulfuric acid in the first mixture is 1 to 3.

4. The method of claim 1, wherein oxidizing the carbon nanotubes comprises oxidizing multi-walled carbon nanotubes.

5. The method of claim 1, further comprising extracting the oxidized carbon nanotubes by drying the oxidized carbon nanotubes in a heated environment.

6. The method of claim 1, wherein mixing the oxidized carbon nanotubes and the monohydrated citric acid to synthesize the carbon nanotubes grafted with poly(citric acid) comprises dissolving the mixture in tetrahydrofouran.

7. The method of claim 1, further comprising extracting the carbon nanotubes grafted with poly(citric acid) by precipitating the mixture in cyclohexane.

8. The method of claim 1, wherein mixing the carbon nanotubes grafted with poly(citric acid) with the osmium tetroxide to synthesize the carbon nanotubes grafted with poly(citric acid) encapsulating osmium nanoparticles comprises mixing the carbon nanotubes grafted with poly(citric acid) with the osmium tetroxide to synthesize carbon nanotubes grafted with poly(citric acid) encapsulating Os(VIII) ions.

9. The method of claim 1, further comprising extracting the carbon nanotubes grafted with poly(citric acid) encapsulating osmium nanoparticles.

* * * * *